Feb. 27, 1951 H. G. MILLER 2,543,042

TUNING MEANS FOR COAXIAL LINE CONDUCTORS

Filed May 7, 1945 2 Sheets-Sheet 1

INVENTOR.
HORACE G. MILLER

BY Percy P. Lantzy
ATTORNEY

TUNING MEANS FOR COAXIAL LINE CONDUCTORS

Filed May 7, 1945 2 Sheets-Sheet 2

INVENTOR.
HORACE G. MILLER
BY Percy P. Lantzy
ATTORNEY

Patented Feb. 27, 1951

2,543,042

UNITED STATES PATENT OFFICE 2,543,042

TUNING MEANS FOR COAXIAL LINE CONDUCTORS

Horace G. Miller, Belleville, N. J., assignor to Federal Telephone and Radio Corporation, New York, N. Y., a corporation of Delaware Application May 7, 1945, Serial No. 592,407

1 Claim. (Cl. 250—40)

The present invention relates to coaxial line radio circuits and particularly to the tuning thereof.

In certain applications employing coaxial line circuits, as, for instance, disclosed in connection with obstacle detection systems, it is frequently desirable to continuously vary over a given range, the operating frequency of the transmitter and the receiver of the system in order to avoid undesired detection of the system and/or the jamming of the operation thereof. In applications of this type, it is usually necessary to tune by tracking in synchronism with the transmitter, at least two circuits in the receiver such as an oscillator and amplifier. A number of tuning methods have been used in the past for this purpose, most of which involve coaxial "short-circuiting" sliders. These sliders, however, have often proven troublesome, and furthermore present numerous difficulties particularly when they are to be ganged as is necessary in the case of multiple circuit tuning.

It is an object of this invention to provide means for periodic tuning over a given frequency range in a system including a plurality of separate tunable circuits.

It is also an object to provide a tracking mechanism for tuning simultaneously several coaxial line circuits.

In accordance with the present invention tuning sliders are eliminated and replaced by fixed short circuits at one end of each line. Tuning of each line is accomplished by capacity variations at the end of the line farthest from the short, or at the maximum voltage region of each line. In one preferred embodiment, of my invention, employing a construction substantially as disclosed in my copending application, Serial No. 589,752, filed April 23, 1945, this is accomplished by a so-called floating rotor with raised inwardly projecting capacitive faces cooperating with corresponding capacitive faces on the inner of the two coaxial line conductors. In illustrating the present invention, I have shown two coaxial line circuits, such as an oscillator and an amplifier in a receiver and another circuit in a transmitter which are being tuned simultaneously to periodically cover given corresponding frequency bands. A single driving shaft is employed to rotate a rotary tuning condenser in a transmitter oscillator and by means of a pair of cams and a link mechanism four variable condensers of two receiver circuits are, in accordance with the above, periodically tuned by oscillatory rotation in one and then in the other direction. The condensers in the cathode and the plate of each of the receiver circuits are ganged for axial and radial movements. One cam each controls the amplifier and the oscillator. Each cam is adjustable in respect to its contour to permit harmonization and synchronization of the respective circuit frequency with the transmitter frequency characteristic.

These and other objects and features of my invention will be better understood from the detailed description of one embodiment thereof made with reference to the accompanying drawings in which.

Figure 1:
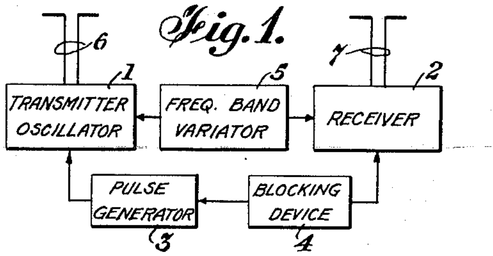
Fig. 1 is a block diagram of a circuit utilizing this invention.

Referring to Fig. 1 there is shown a typical radio obstacle detection system such as may embody the present invention, comprising a transmitter-oscillator 1, and a receiver 2. The transmitter 1 is modulated by the output of a pulse generator 3 and the operation of both the transmitter and the receiver is controlled by means of a blocking device 4 of known form causing alternate operation of the two circuits to avoid undesirable overlap. The transmitter-oscillator circuit and the receiver circuit are subject to control by a frequency band variator 5. Antennas 6 and 7 serve to transmit and to receive obstacle detection pulses and their echoes respectively.

For a more complete understanding of radio detection systems of this type reference may be made to the disclosures contained in the copending application of H. G. Busignies, Serial No. 381,640, filed March 4, 1941, and the patent to E. Labin, No. 2,408,076, dated September 24, 1946.

Figure 2:
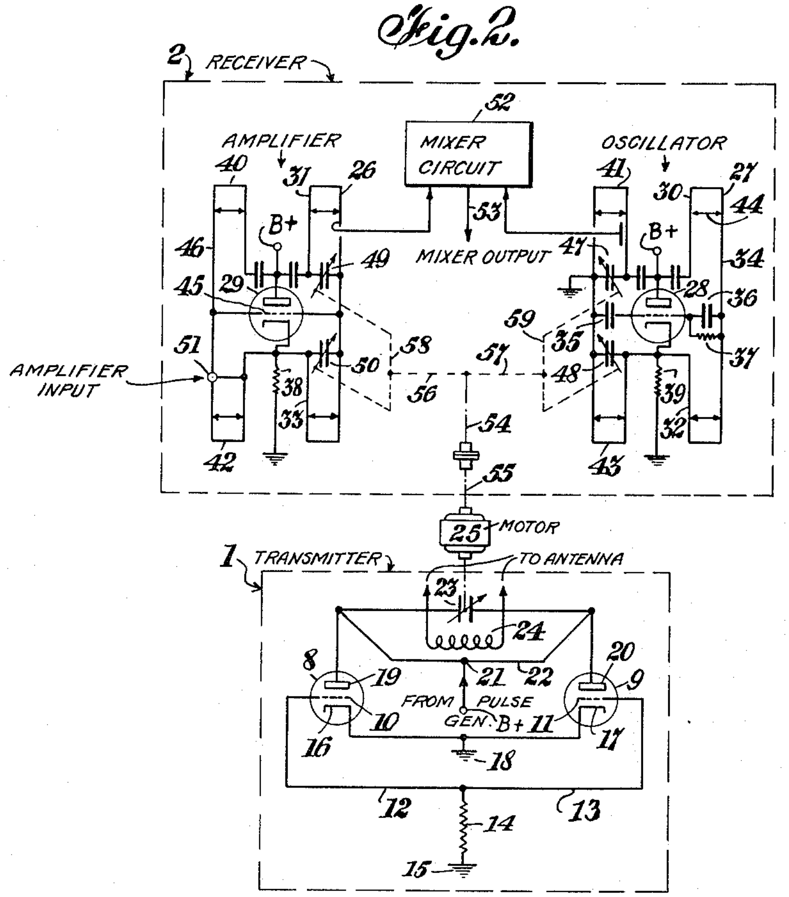
Fig. 2 is a representation partly in block and partly in diagrammatic form of the receiver and the transmitter circuit including the frequency band variator of the circuit of Fig. 1.

As shown more particularly in Fig. 2 one preferred form of obstacle detection apparatus includes a transmitter-oscillator containing two tubes 8 and 9 arranged in push-pull with grids 10 and 11 thereof connected to a pair of wires 12 and 13 which may be of the Lecher type which serve to tune the grid circuits of the tubes. A resistor 14 serves to provide a bias for the grids with respect to ground at 15. Cathodes 16 and 17 of the two oscillator tubes are connected to a common ground return point at 18. The plates 19 and 20 may be tied together to receive the output from the pulse generator 3 at a mid-point 21 of a common connection 22. For the purpose of varying the frequency band within which the transmitter-oscillator is to operate the plates 19 and 20 are connected or coupled to a variable condenser 23. The oscillator is shown coupled to the antenna 6 by means of a coupling coil 24. It will be understood, of course, that other types of ultra-high frequency oscillators may be employed. To simultaneously and continuously vary the tuning of the plate circuit of the oscillator and the circuits of the receiver as will be described hereinbelow, I provide a motor 25 which is mechanically coupled to the condenser 23 and which may be driven at any desired rate to vary the tuning of the circuits. The condenser 23 is so chosen as to withstand high voltages and to vary the tuning of the circuits associated therewith in a band extending over 90 megacycles more or less as desired. This wide variation of the operating frequency of the obstacle detection system as hereinbefore stated is desirable so as to render difficult the determination of the character of transmission even when such transmission has been detected.

The receiver 2 as shown in greater detail in Fig. 2 may be comprised of a radio frequency grounded grid coaxial line amplifier 26 and a tuned-plate, tuned-cathode coaxial line oscillator 27. Each of these coaxial circuits may comprise a triode 28 and 29 having their respective plates connected to an inner coaxial conductor 30 and 31. The cathodes are similarly connected to corresponding inner conductors 32 and 33. As is usual in circuits of this type the grids act to electrostatically separate the plate and cathode circuits. In the present oscillator the grid is connected to an outer coaxial conductor 34 by means of circuit tuning condenser 35 and 36, the latter condenser being by-passed by means of a grid resistor 37. Both the amplifier and oscillator cathodes are biased to ground by signal resistors 38 and 39. The inner and outer coaxial line conductors of both of the plates and of both the cathodes are short-circuited at their outer ends as indicated at 40, 41, 42 and 43 respectively. The respective impedance of the plate and cathode circuits may be varied by short-circuiting slides such as the one shown at 44 in the plate circuit of the oscillator. Grid 45 of the amplifier 27 is connected directly to outer conductor 46. In order to obtain variation in the frequency of the respective plate and cathode circuits variable tuning condensers have been provided in these circuits indicated at 47 and 48 for the oscillator and at 49 and 50 for the amplifier. The ultra-high frequency input to the amplifier may be applied to the grid and cathode circuits thereof, respectively at 51. The output of the amplifier and that of the oscillator are combined in a mixer circuit 52, the resulting beat frequency of which may be obtained for application to suitable intermediate frequency circuits at 53. As referred to hereinabove the motor 25 is mechanically linked to the condensers 47 through 50 by means of a driving mechanism 54 which includes a driven main shaft 55 linkages 56 and 57 and ganged tuning mechanisms 58 and 59 respectively.

Figure 3:
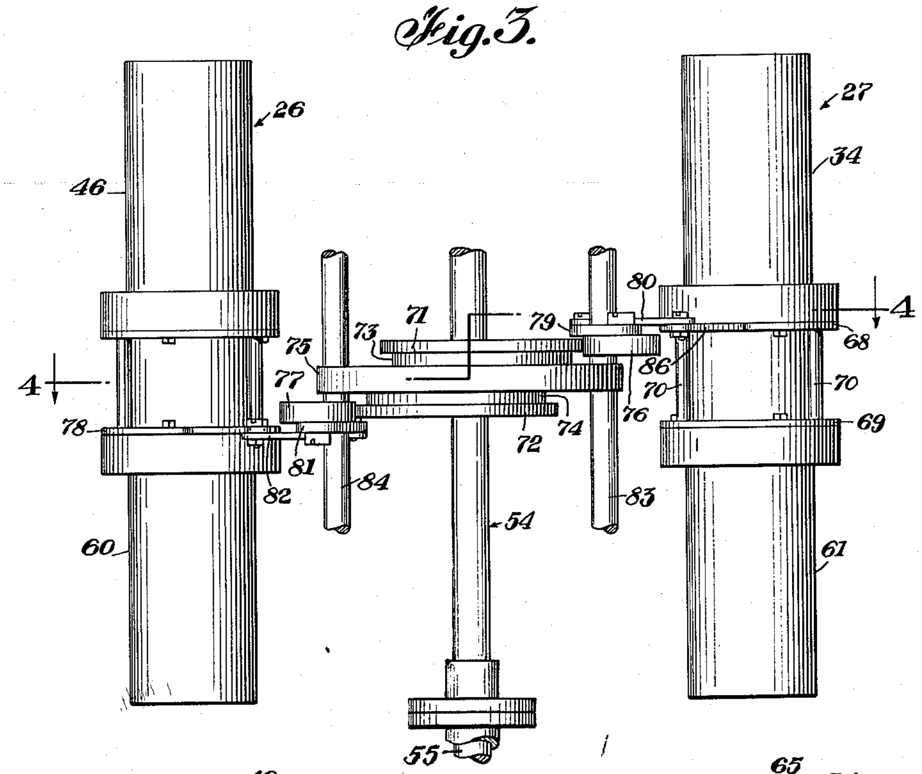
Fig. 3 is a side view of the physical structure of the amplifier, oscillator and the frequency variator of Fig. 2.
Figure 4:
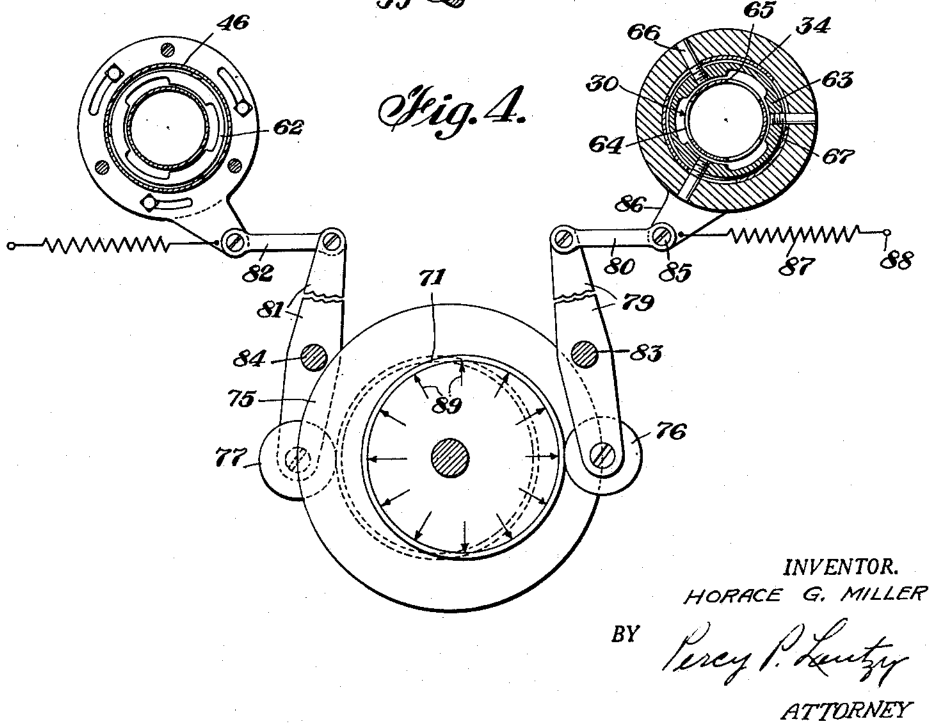
Fig. 4 is a plan view of a section taken along the line 4—4 of Fig. 3 and viewed in the direction as indicated.

The tuning mechanism for the four tuning condensers 47 through 50 will now be described in connection with Figs. 3 and 4. In the physical representation of the amplifier and oscillator coaxial line type circuits in Figs. 3 and 4, the outer conductors of the amplifier and oscillator are shown to comprise the tubular members 46 and 34 for the plate circuits and the members 60 and 61 respectively for the cathodes of the two circuits. The variable circuit-tuning condensers 47 through 50 are of similar construction throughout substantially in accordance with the disclosure thereof in my copending application referred to above. As shown in the sections of the coaxial line circuits in Fig. 4, the outer conductors 34 and 46, and of course, the corresponding conductors for the cathode circuits, have mounted on the inside thereof rotors in the form of a rotatable conductive ring 62 which may be freely floating as shown or may be frictionally engaging the inner wall of the outer conductor and provided with a plurality of inwardly projecting capacitive faces 63 whose inner surfaces are preferably arcuate. The walls of the inner conductor 30 are cut-away as indicated at 64 so as to leave arcuate segments 65. In the position indicated in Fig. 4 the segments 65 are juxtaposed in respect to the capacitive faces 63. Short-arms or pins 66 may extend through slots 67 in the outer conductor and are connected to the ring 62 forming a rigid structure with a driving ring 68 mounted on the outside of the outer conductor. By moving the rings 68 a capacity between the capacitive faces 63 and the arcuate segments 65 may be varied, thereby tuning, the respective associated circuit. Another capacity exists, in the case of the floating rotor, between the rotor and the inner surface of the outer conductor. In the example here indicated, the rotative angle is such that the tuning condenser ring 68 and therewith the tuning ring 62 may be moved through about 60 degrees in covering the tuning for the predetermined frequency range. A similar arrangement is provided for the tuning of the cathode line 61 and the corresponding circuits of the amplifier 26. The tuning condenser in the cathode line of the oscillator is provided with a driven ring 69 which is ganged to the driving ring 68 by means of several pins 70 extending parallel to the axis of the oscillator structure. In order to be able to periodically tune the oscillator and amplifier circuits over a given frequency range from the drive shaft 55—54, a pair of cams 71 and 72 have been provided which are mounted out of center with respect to the shaft 54 on supporting plates 73 and 74 secured to opposite faces of a disc 75. The disc 75 is axially mounted to be rotated by the shaft 54. Each of the cams 71 and 72 is adapted to engage for driving the followers 76 and 77 respectively. The lateral thrusts imparted to the followers 76 and 77 are transmitted to the respective driving rings 68 on the oscillator and 78 on the amplifier by means of link members 79 and 80 for the oscillator and members 81 and 82 for the amplifier. The members 79 and 81 are pivoted about stationary axes 83 and 84 respectively. The link member 80 is fastened to its associated ring 68 by means of a bolt 85 disposed on an extension 86 of the ring 68. A spring 87 which is anchored to a stationary point 88 of the apparatus structure serves to impart a return stroke to the ring 68 in opposition to the motion imparted thereto by the corresponding cam and link members. A similar structure for operatively linking the cam 72 with the corresponding variable condenser is provided for the amplifier and will not therefore be described again. Both of the cams 71 and 72 are so designed as to be easily adjustable in respect to their peripheral configuration by any one of several known methods as indicated by the radial arrows 89 in view of Fig. 4.

The operation of the tuning system hereinabove described is self-explanatory and it will therefore suffice to say that upon rotation of the common shaft 55—54 both the transmitter and the receiver circuits will be periodically tuned over a given frequency range as substantially shown in Fig. 5 where the variation in the frequencies of the transmitter and of the two receiver circuits are shown against the relative angular position of the shaft. The maximum angle $\theta$ attained is an angle of 60 degrees corresponding to the maximum possible displacement provided in the structure of the receiver tuning circuits.

Figure 5:
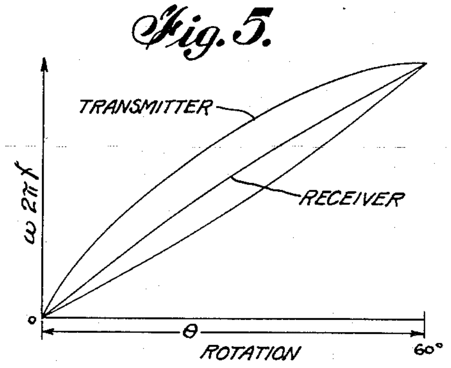
Fig. 5 is a graph showing the relation between the rotary position of the frequency variator and the frequencies in the receiver circuits as related to the frequency of the transmitter.

It will be seen from the graphs of Fig. 5 that in the example shown the tuning characteristics of the receiver circuits are substantially more linear because of the construction of the tuning capacitors as compared to the rotary tuning condenser in the transmitter which produces a somewhat non-linear characteristic. It is to synchronize and to improve the alignment of these characteristics that the peripheral adjustment of the cams is provided for.

While I have described my invention in connection with a specific transmitter and receiver as applied to a radio obstacle detection system, it will be seen that my invention is applicable to other circuit combinations and other forms of coaxial line circuits. It will also be seen that various details hereinabove described may be varied without departing from the teachings of my invention. For example, I have shown constructional details in the tuning condensers of the coaxial line circuits as well as in the rotary mechanical oscillating system which may be varied within the scope of the invention.

Therefore while I have described above the principles of my invention in connection with specific apparatus it is to be clearly understood that this description is made only by way of example and not as a limitation on the scope of my invention.

I claim:

A system for tracking the tuning of a first and second circuit, each of said circuits comprising a resonant transmission line section, means for simultaneously tuning said line sections comprising respective rotatably adjustable condensers, a rotatable shaft, a cam means for each of said circuits disposed for rotation on said shaft, means for operatively linking each of said cam means with a respective rotatable condenser for imparting a limited angular reciprocating motion thereto, each of said transmission line sections comprising a coaxial transmission line comprising an inner and outer conductor, each of said condensers comprising a stator element concentric with said inner conductor and an annular rotor element rotatable about said inner conductor, and said means for operatively linking each of said cam means with its respective condenser comprising separate link members rotatable about individual axes and means for coupling one end of each link member to a respective rotor element and means for engaging the other end of each link member to be driven by a respective cam means.

HORACE G. MILLER.

REFERENCES CITED

The following references are of record in the file of this patent:

UNITED STATES PATENTS

| Number | Name | Date |
|---|---|---|
| 1,441,212 | Cardwell | Jan. 9, 1923 |
| 2,219,922 | Gossel | Oct. 29, 1940 |
| 2,232,833 | Wilhelm | Feb. 25, 1941 |
| 2,292,880 | Koch et al. | Aug. 11, 1942 |
| 2,342,254 | Dallenbach | Feb. 22, 1944 |
| 2,372,231 | Terman | Mar. 27, 1945 |
| 2,402,606 | Davis | June 25, 1946 |
| 2,408,791 | Magnuski | Oct. 8, 1946 |
| 2,408,895 | Turner | Oct. 8, 1946 |
| 2,417,182 | Sands | Mar. 11, 1947 |
| 2,438,477 | Dodds et al. | Mar. 23, 1948 |